United States Patent
Gronkiewicz

[11] Patent Number: 6,067,686
[45] Date of Patent: May 30, 2000

[54] LUG NUT AND WHEEL RIM CLEANING DEVICE

[76] Inventor: Kevin Gronkiewicz, 3725 Rhoten, Sterling Heights, Mich. 48310

[21] Appl. No.: 09/239,326

[22] Filed: Jan. 28, 1999

[51] Int. Cl.[7] .................................................. A47L 25/00
[52] U.S. Cl. ......................... 15/244.4; 15/244.1; D32/40
[58] Field of Search .............................. 15/244.1, 244.4; D32/35, 40

[56] References Cited

U.S. PATENT DOCUMENTS

| | | | |
|---|---|---|---|
| 3,118,163 | 1/1964 | Abberly | 15/244.1 |
| 3,221,354 | 12/1965 | Noyes | 15/118 |
| 3,327,339 | 6/1967 | Lemelson | 15/209.1 |
| 3,694,845 | 10/1972 | Engelsher | 15/244.4 |
| 4,117,566 | 10/1978 | Ward | 15/244.1 |
| 4,120,068 | 10/1978 | Kaczmarek | 15/160 |
| 5,123,763 | 6/1992 | Simmons | 401/9 |

*Primary Examiner*—Mark Spisich
*Attorney, Agent, or Firm*—Harness, Dickey & Pierce, P.L.C.

[57] ABSTRACT

A vehicle lug nut cleaning device is provided including an elongated generally cylindrical sponge having an opening extending longitudinally of the generally cylindrical sponge for receiving a head of a lug nut therein. The elongated generally cylindrical sponge has a sufficient length to allow an end of the generally cylindrical sponge to be trimmed for reuse.

3 Claims, 2 Drawing Sheets

LUG NUT AND WHEEL RIM CLEANING DEVICE

BACKGROUND OF THE INVENTION

Field of the Invention

The present invention relates generally to a vehicle lug nut cleaning device, and more particularly to a vehicle lug nut cleaning device which is capable of reuse.

BACKGROUND AND SUMMARY OF THE INVENTION

The automotive industry is increasingly going toward decorative wheel rims which do not require coverings such as hub caps which typically covered the lug nuts used for mounting the wheel rims to a wheel hub of a vehicle. One drawback of these decorative wheel rims is the resulting difficulty that is often encountered when trying to clean hard-to-reach cracks and crevices provided in such wheel rims. This has resulted in the necessity to completely remove the wheels, cleaning each nut that mounts the wheels separately as well as the openings receiving the lug nuts and the irregular shaped openings provided in such wheels. This is a time consuming and laborious process. Accordingly, the present invention provides a cleaning implement used in cleaning around the lug nuts of a wheel rim without the necessity of having to remove the wheel from the vehicle.

Known lug nut cleaning devices are disclosed in U.S. Pat. No. 4,117,566 issued to Ward and U.S. Pat. No. 4,120,068 issued to Kaczmarek. The U.S. Pat. No. 4,117,566 issued to Ward uses a sponge which forms an inner shaft way and a shaft with a bottom plate attached to the bottom of the shaft onto which the sponge body is attached by adhesive. Similarly, the device of U.S. Pat. No. 4,120,068 provides a handle to which is mounted a cylindrical member having brush bristles on its exterior and interior surfaces. However, a common drawback with each of these types of lug nut cleaning devices is that these devices are relatively expensive to produce, due in large part to the production of the handle assembly which is attached to the cleaning implements. Furthermore, as the cleaning implements wear out during use, the entire cleaning device is rendered useless. Accordingly, the present invention attempts to overcome these drawbacks.

In particular, the present invention provides a vehicle lug nut cleaning device including an elongated generally cylindrical sponge having an opening extending longitudinally of the generally cylindrical sponge for receiving a head of a lug nut therein. The elongated generally cylindrical sponge has a sufficient length to allow an end of the generally cylindrical sponge to be trimmed for re-use. According to a further aspect of the present invention, the opening in the elongated generally cylindrical sponge is defined by an internal wall surface including a plurality of convex and concave arcuate surface portions disposed adjacent to one another. The irregular shape of the internal wall surface provides for a better scrubbing action on the exterior surface of the lug nut. According to still another aspect of the present invention, an outer surface of the elongated generally cylindrical sponge has a plurality of spaced arcuate surface portions separated by a plurality of spaced flat surface portions. The plurality of spaced flat surface portions allow for cleaning solution, soap, or water to gather in the areas between the flat portions and the recesses in the wheel rim as well as allowing dirt and grime to also accumulate in these areas.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
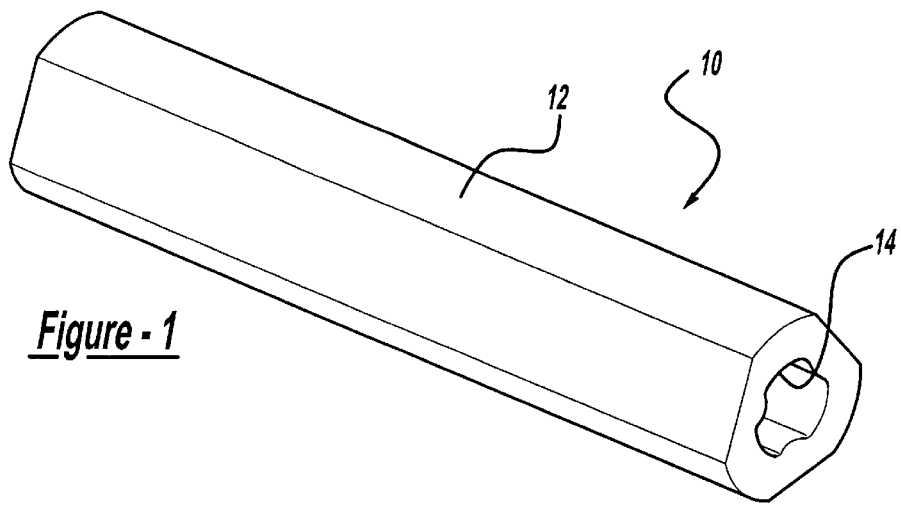
FIG. 1 is a perspective view of the lug nut cleaning device according to the principles of the present invention.

With reference to FIGS. 1–4, the vehicle lug nut cleaning device of the present invention will now be described. As shown in FIG. 1, the vehicle lug nut cleaning device 10 includes an elongated generally cylindrical sponge 12 having an opening 14 extending longitudinally of the generally cylindrical sponge body. The opening 14 is sufficiently large to receive a head of a lug nut therein. It should be noted that the size of the opening 14 may be slightly smaller than the head of the lug nut, although it should be capable of being stretched or expanded outward to receive the head of a lug nut. The elongated generally cylindrical sponge also is provided with a length "L" which is sufficient to allow an end of the generally cylindrical sponge to be trimmed for multiple re-use if the ends of the lug nut cleaning device 10 become frayed or torn.

Figure 2:
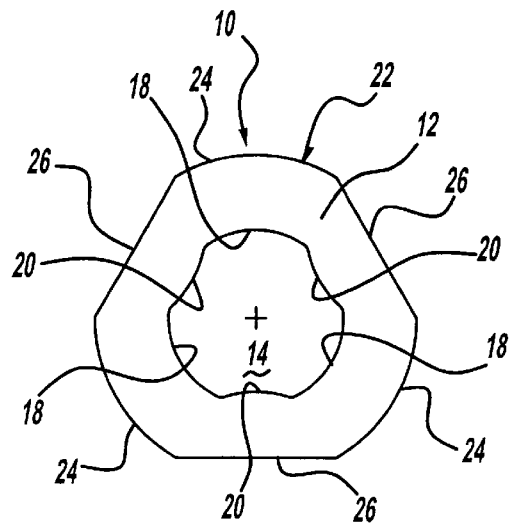
FIG. 2 is an end view of the lug nut cleaning device according to the principles of the present invention.

With reference to FIG. 2, the central opening 14 in the lug nut cleaning device 10 is provided with a plurality of concave arcuate surface portions 18 disposed between spaced convex arcuate surface portions 20. As shown in FIG. 2, three concave arcuate surface portions 18, and three convex arcuate surface portions 20 are provided.

The outer surface 22 of the generally cylindrical sponge body 12 includes a plurality of arcuate surface portions 24 as well as a plurality of spaced flat portions 26 disposed between the arcuate surface portions 24.

Figure 4:
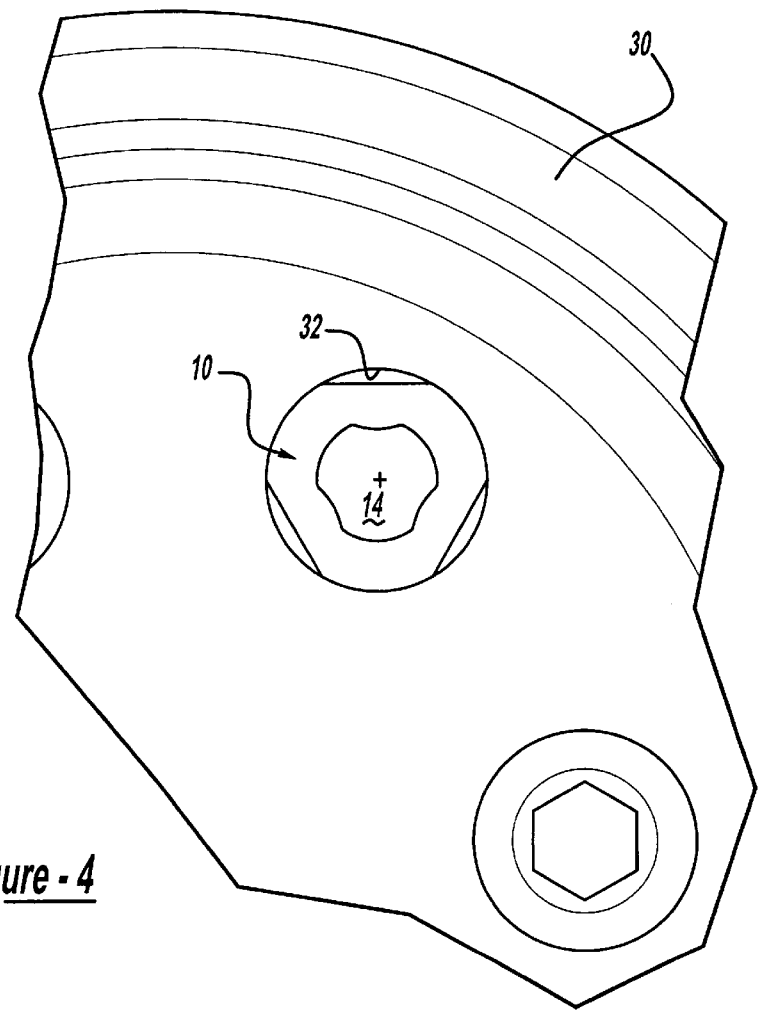
FIG. 4 is a partial plan view illustrating the lug nut cleaning device received in a recess in the wheel rim according to the principles of the present invention.
Figure 3:
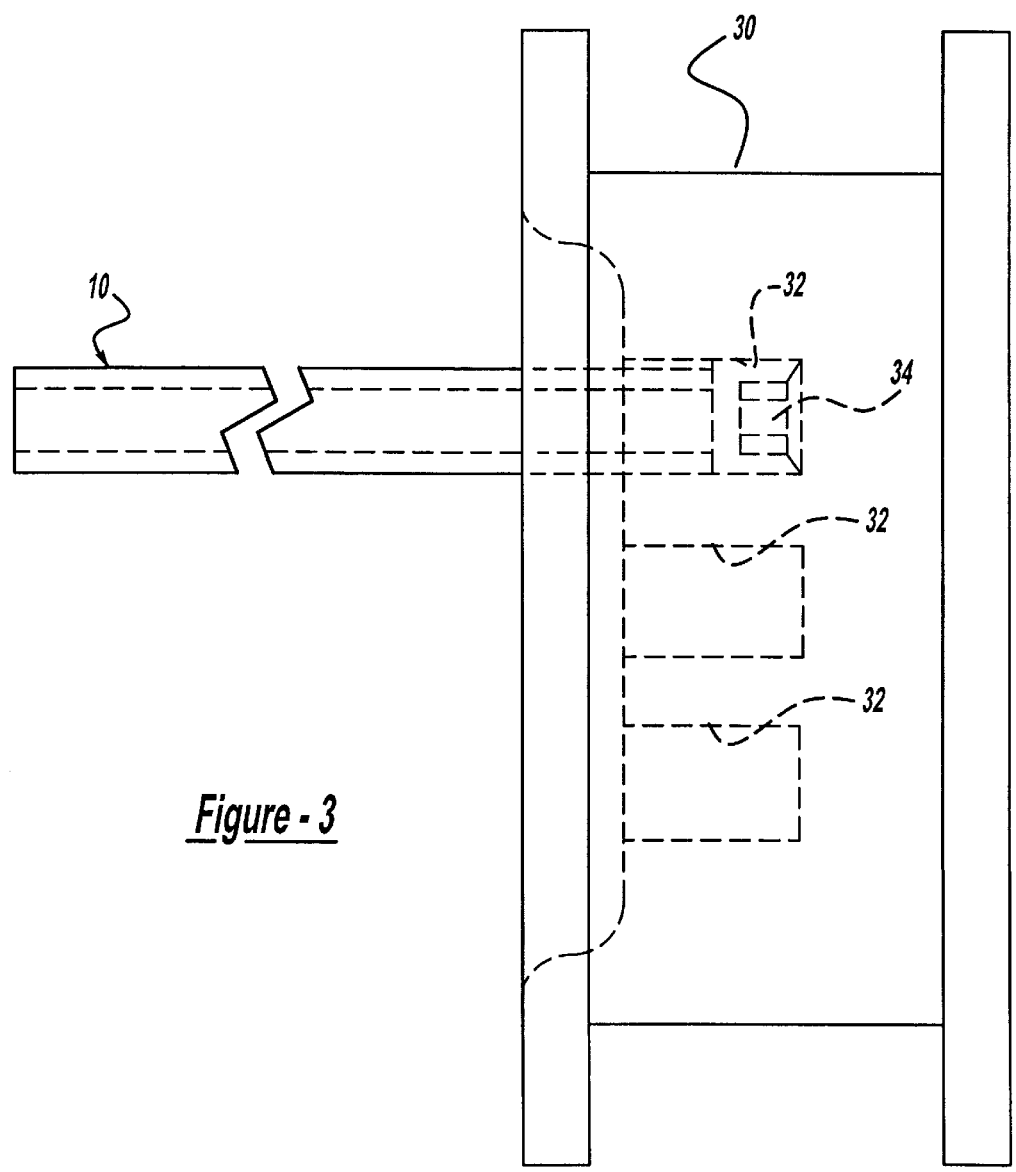
FIG. 3 is a side view of a wheel rim with the lug nut cleaning device inserted in a recess in the wheel rim according to the principles of the present invention.

With reference to FIG. 3, the lug nut cleaning device 10 is shown being inserted in a recess 32 of a wheel rim 30. The head 34 of a lug nut is then received within the opening 14 of the lug nut cleaning device 10. The lug nut cleaning device 10 can then be rotated to clean the exterior surface of the lug nut 34 as well as the interior surface of the recess 32 of the wheel rim 30. FIG. 4 illustrates how the lug nut cleaning device 10 is received within the recess 32 of the wheel rim 30.

The plurality of concave and convex arcuate surface portions 18, 20 of the central opening 14 provide a scrubbing action on the outer surface of the lug nut, while the arcuate surface portions 24 along with the flat surface portions 26 provide a scrubbing action on the internal surface of the recesses 32. Furthermore, the flats 26 allow the accumulation of dirt and grime removed from the wall of the recesses 32 to accumulate in the area of the flats as well as allowing cleaning solution to accumulate in these areas so that the surface of the recess 32 can be adequately exposed to the cleaning solution.

The lug nut cleaning device 10 is of sufficient length such that as the sponge body becomes worn or frayed at the ends, the ends can be trimmed for reuse.

The vehicle lug nut cleaning device 10 of the present invention can be manufactured much more inexpensively than conventional lug nut cleaning devices. Furthermore, due to the ability to trim the lug nut cleaning device of the present invention for re-use, the useful life of the lug cleaning device is greatly extended as compared to the current lug nut cleaning devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle lug nut cleaning device, comprising:

an elongated generally cylindrical sponge having an opening extending longitudinally of said generally cylindrical sponge for receiving a head of a lug nut therein, said elongated generally cylindrical sponge having a sufficient length to allow an end of said generally cylindrical sponge to be trimmed for reuse;

wherein said opening in said elongated generally cylindrical sponge is defined by an internal wall surface including a plurality of convex and concave arcuate surface portions disposed adjacent to one another.

2. The vehicle lug nut cleaning device according to claim 1, wherein an outer surface of said elongated generally cylindrical sponge has a plurality of spaced arcuate surface portions separated by a plurality of spaced flat surface portions.

3. A vehicle lug nut cleaning device, comprising:

an elongated generally cylindrical sponge having an opening extending longitudinally of said generally cylindrical sponge for receiving a head of a lug nut therein, said elongated generally cylindrical sponge having a sufficient length to allow an end of said generally cylindrical sponge to be trimmed for reuse;

wherein an outer surface of said elongated generally cylindrical sponge has a plurality of spaced arcuate surface portions separated by a plurality of spaced flat surface portions.

* * * * *